United States Patent Office 3,347,906
Patented Oct. 17, 1967

3,347,906
7-(2,6,6,8-TETRAMETHYL-4-OXA-3-OXO-NONYL)-
BENZYL PHTHALATE
Dale Robert Dill, Webster Groves, Mo., assignor to
Monsanto Company, St. Louis, Mo., a corporation
of Delaware
No Drawing. Filed Dec. 31, 1964, Ser. No. 422,518
1 Claim. (Cl. 260—475)

This invention relates to 7-(2,6,6,8-tetramethyl-4-oxa-3-oxo-nonyl)benzyl phthalate as a new compound.

7-(2,6,6,8-tetramethyl-4-oxa-3-nonyl)benzyl phthalate can be readily prepared by reacting phthalic anhydride with 2,6,6,8-tetramethyl-4-oxa-3-oxo-nonan-7-ol to produce a half ester, and thereafter reacting the half ester with a tertiary aliphatic amine and a benzyl halide.

The invention will be more fully understood by reference to the following example, which describes the detailed preparation of 7-(2,6,6,8-tetramethyl-4-oxa-3-oxo-nonyl)benzyl phthalate. Such example is given for the purpose of illustration only, and is not to be construed as limiting the scope of this invention in any way.

EXAMPLE 1

To a suitable reaction vessel having means for the addition and removal of heat, means for measuring the temperature of the reaction mass, means for agitating the reaction mass, means for the addition and removal of solids and liquids, and fitted with a condenser, there are charged 296.2 grams (2.0 mols) of phthalic anhydride and 436.9 grams (2.02 mols) of 2,6,6,8-tetramethyl-4-oxa-3-oxo-nonan-7-ol. The mixture is heated to about 124° C., and 212.5 grams (2.10 mols) of triethylene are added. There is then added 272.15 grams (2.15 mols) of benzyl chloride. The resultant mixture is held at a temperature of about 138° C. for about one hour and then washed with several water and lye washes. The oil layer from the washing step is steam sparged and dehydrated at 125–130° C. at 60–70 mm. Hg. There is obtained 860.8 grams (94.7% of theory) of 7-(2,6,6,8-tetramethyl-4-oxa-3-oxo-nonyl) benzyl phthalate.

The product of this invention is useful as a plasticizer for vinyl halide-containing polymers. The following test procedures are used in evaluating the physical properties of the plasticizer.

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably; i.e., plasticized polyvinyl chloride compositions that are flexible at room temperature often become very brittle and useless at lower temperatures. Low-temperature flexibility tests herein employed are according to the Clash-Berg method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized composition's usefulness as an elastomer.

*Volatility.*—A decrease in plasticizer concentration, caused by volatilization of the plasticizer, often results in decreased flexibility of a plasticized polymer composition. Hence, plasticizers which are readily volatilized from the plasticized composition as a result of aging or heating are inefficient because, upon volatilization, the plasticized composition becomes stiff and hard. The test for plasticizer volatility employed herein is that described by the American Society for Testing Materials under the designation, D-1203–55T.

*Hardness.*—A standard instrument made by the Shore Instrument and Manufacturing Company is used for this determination and expresses the hardness in units from 1 to 100. The hardness of a composition is judged by its resistance to the penetration of a standard needle applied to the composition under a standard load for a standard length of time.

*Kerosene extraction.*—Resistance to kerosene is measured as follows: A 2″ diameter 40 mil. disc is suspended in a 50° C. oven for a 3-hour conditioning period to eliminate water, then cooled and weighed. The conditioned sample is then immersed in 400 ml. of kerosene for a period of 24 hours at 23° C. The sample is then removed from the kerosene, blotted dry and suspended in a force-draft 80° C. oven for 4 hours. The sample is then cooled and weighed. The percent loss in weight is reported as the kerosene extraction value.

The following example illustrates the advantageous and unexpected results which are achieved by the use of the ester of the present invention in vinyl halide-containing polymers, but it is not intended that the invention be limited by or to such example.

EXAMPLE 2

One hundred parts by weight of polyvinyl chloride and 60 parts by weight of 7-(2,6,6,8-tetramethyl-4-oxa-3-oxo-nonyl)benzyl phthalate, obtained in Example 1, are mixed on a rolling mill to a homogeneous blend. During the milling, substantially no discoloration is observed. The molded sheet of the mixture is clear and transparent. Testing of the molded sheet for low-temperature flexibility, according to the procedure described above, gives a value of 2.9° C., which value denotes good low-temperature properties. A test of the volatility characteristics of the composition gives a value of 0.7%. Tests of the water-resistance properties of the plasticized material, employing the test procedure described above, indicate no loss of soluble matter and a water absorption value of 0.34%. The plasticized material has an initial Shore hardness of 80. A kerosene extraction value of 0.2% is obtained on this composition.

The ester plasticizer of this invention additionally imparts excellent stain resistance when incorporated in plastic floor coverings.

While the above examples show only compositions in which the ratio of plasticizer to polymer is 60:100, this ratio being employed in order to obtain comparable efficiencies, the content of ester to polyvinyl chloride may vary widely, depending upon the properties desired in the final product. Generally speaking, about 5 to 200 parts by weight of plasticizer can be used for each 100 parts by weight of vinyl halide-containing resin. However, it is preferred to use from about 20 to 100 parts by weight of plasticizer per 100 parts by weight of resin. The present ester is compatible with polyvinyl chloride over a wide range of concentrations, up to 50% of the ester based on the total weight of the plasticized composition yielding a desirable product.

Although the invention has been described particularly with reference to the use of 7-(2,6,6,8-tetramethyl-4-oxa-3-oxo-nonyl)benzyl phthalate as a plasticizer for polyvinyl chloride, this ester is advantageously employed also as a plasticizer for the copolymers of vinyl chloride; for example, the copolymers of vinyl chloride with vinyl acetate, vinylidene chloride, methyl methacrylate, etc. Preferably, such copolymers have a vinyl chloride content of at least 70% by weight of the vinyl chloride and up to 30% by weight of the copolymerizable monomer.

The plasticized polyvinyl halide compositions of the present invention have good thermal stability; however, for many purposes, it may be advantageous to also use known stabilizers in the plasticized compositions. Inasmuch as the present ester is substantially unreactive with the commercially available heat and light stabilizers which are commonly employed with polyvinyl chloride or copolymers thereof, the presence of such materials in the plasticized materials does not impair the valuable properties of the present ester. The present ester is of general utility in softening vinyl chloride polymers. The ester may be used as the only plasticizing component in a compounded vinyl chloride polymer, or it may be used in conjunction with other plasticizers.

While this invention has been described with respect to certain specific embodiments, it is not so limited. It is to be understood that variations and modifications thereof may be made without departing from the spirit and scope of the invention.

The embodiments of the invention in which an exclusive property or privilege is claimed are defined as follows:

7-(2,6,6,8 - tetramethyl-4-oxa - 3 - oxo - nonyl)benzyl phthalate.

References Cited

UNITED STATES PATENTS 3,160,599  12/1964  Scullin _____ 260—476

RICHARD K. JACKSON, *Primary Examiner.*

T. L. GALLOWAY, *Assistant Examiner.*